(12) United States Patent
Yang et al.

(10) Patent No.: US 10,080,034 B2
(45) Date of Patent: Sep. 18, 2018

(54) METHOD AND APPARATUS FOR PREDICTIVE FRAME SELECTION SUPPORTING ENHANCED EFFICIENCY AND SUBJECTIVE QUALITY

(75) Inventors: Hua Yang, Princeton, NJ (US); Adarsh Golikeri, Plainsboro, NJ (US); Alan Jay Stein, Princeton Junction, NJ (US)

(73) Assignee: Thomson Licensing DTV, Issy-les-Moulineaux (FR)

( * ) Notice: Subject to any disclaimer, the term of this patent is extended or adjusted under 35 U.S.C. 154(b) by 816 days.

(21) Appl. No.: 12/736,097

(22) PCT Filed: Jan. 30, 2009

(86) PCT No.: PCT/US2009/000637
§ 371 (c)(1),
(2), (4) Date: Sep. 9, 2010

(87) PCT Pub. No.: WO2009/114054
PCT Pub. Date: Sep. 17, 2009

(65) Prior Publication Data
US 2011/0002380 A1 Jan. 6, 2011

Related U.S. Application Data

(60) Provisional application No. 61/035,187, filed on Mar. 10, 2008.

(51) Int. Cl.
*H04N 7/12* (2006.01)
*H04N 19/577* (2014.01)
(Continued)

(52) U.S. Cl.
CPC ......... *H04N 19/577* (2014.11); *H04N 19/103* (2014.11); *H04N 19/114* (2014.11);
(Continued)

(58) Field of Classification Search
CPC .... H04N 19/139; H04N 19/172; H04N 19/15; H04N 19/61; H04N 19/103;
(Continued)

(56) References Cited

U.S. PATENT DOCUMENTS 6,480,670 B1   11/2002 Hatano et al.
6,597,738 B1 *  7/2003 Park ................. G06T 7/223
                                         375/240.16

(Continued)

FOREIGN PATENT DOCUMENTS

GB       2418557       3/2006
JP       H08-46969 A2  2/1996

(Continued)

OTHER PUBLICATIONS

Yoneyama et al., "MPEG Encoding Algorithm With Scene Adaptive Dynamic GOP Structure", Internet Applications Laboratory, KDD R&D Laboratories Inc., Saitama, Japan, 1999, pp. 297-302.

(Continued)

*Primary Examiner* — Y Lee
*Assistant Examiner* — Richard Carter
(74) *Attorney, Agent, or Firm* — Brian J. Dorini; Ronald J. Kolczynski

(57) ABSTRACT

A method and apparatus are provided for predictive frame selection supporting enhanced efficiency and subjective quality. The apparatus includes an encoder for encoding a picture using a selection scheme that selects between encoding the picture as a single direction inter predictive picture type and a bi-directional inter predictive picture type based on coding efficiency and a determination of a flickering artifact resulting from coding the picture as the bi-directional inter predictive picture type.

2 Claims, 2 Drawing Sheets

(51) Int. Cl.
*H04N 19/139* (2014.01)
*H04N 19/172* (2014.01)
*H04N 19/15* (2014.01)
*H04N 19/61* (2014.01)
*H04N 19/103* (2014.01)
*H04N 19/114* (2014.01)
*H04N 19/137* (2014.01)
*H04N 19/194* (2014.01)
*H04N 19/86* (2014.01)

(52) U.S. Cl.
CPC ......... *H04N 19/137* (2014.11); *H04N 19/139* (2014.11); *H04N 19/15* (2014.11); *H04N 19/172* (2014.11); *H04N 19/194* (2014.11); *H04N 19/61* (2014.11); *H04N 19/86* (2014.11)

(58) Field of Classification Search
CPC .. H04N 19/114; H04N 19/137; H04N 19/194; H04N 19/86; H04N 19/577
USPC ............ 375/240.02, 240.03, 240.13, 240.15, 375/240.16
See application file for complete search history.

(56) References Cited

U.S. PATENT DOCUMENTS

| | | | |
|---|---|---|---|
| 8,194,735 | B2 | 6/2012 | Matsumura et al. |
| 2002/0037051 | A1 | 3/2002 | Takenaka |
| 2004/0153937 | A1* | 8/2004 | Moon ................. H04N 19/895 714/746 |
| 2005/0147167 | A1 | 7/2005 | Dumitras et al. |
| 2007/0036213 | A1* | 2/2007 | Matsumura .......... H04N 19/139 375/240.03 |
| 2007/0074266 | A1 | 3/2007 | Raveendran et al. |
| 2007/0081591 | A1 | 4/2007 | Ahn |
| 2008/0025397 | A1* | 1/2008 | Zhao et al. ............. 375/240.13 |
| 2008/0101465 | A1* | 5/2008 | Chono et al. ........... 375/240.03 |
| 2009/0046092 | A1 | 2/2009 | Sato et al. |
| 2010/0014589 | A1* | 1/2010 | Kondo .................. H04N 19/50 375/240.16 |
| 2010/0111188 | A1* | 5/2010 | Takahashi et al. ...... 375/240.16 |
| 2010/0128787 | A1* | 5/2010 | Jeon et al. ............... 375/240.15 |
| 2011/0002380 | A1* | 1/2011 | Yang et al. ............. 375/240.02 |

FOREIGN PATENT DOCUMENTS

| | | |
|---|---|---|
| JP | H9-055939 A | 2/1997 |
| JP | 2002101416 A | 4/2002 |
| JP | 2007-049629 A | 2/2007 |
| JP | 2007-214785 A | 8/2007 |

OTHER PUBLICATIONS

Wang et al., "Dynamic GOP Structure Determination for Real-Time MPEG-4 Advanced Simple Profile Video Encoder", IEEE, 2005.

Lee et al., "Rate-Distortion Optimized Frame Type Selection for MPEG Encoding", IEEE Transactions on Circuits and Systems for Video Technology,vol. 7,No. 3,Jun. 1997,pp. 501-510.

Lee et al., "Temporally Adaptive Motion Interpolation Exploiting Temporal Masking in Visual Perception", IEEE Transactions on Image Processing,vol. 3, No. 5,Sep. 1994, pp. 513-526.

Lan et al., "Scene-Context-Dependent Reference-Frame Placement for MPEG Video Coding", IEEE Transactions on Circuits and Systems for Video Technology,vol. 9, No. 3, Apr. 1999, pp. 478-489.

Katto et al.,"Mathematical Analysis of MPEG Compression Capability and Its Application to Rate Control",Information Technology Research Laboratories,NEC Corporation,IEEE,1995.

Dumitras et al., "I/P/B Frame Type Decision by Collinearity of Displacements", 2004 International Conference on Image Processing (ICIP),IEEE, 2004, pp. 2769-2772.

PCT International Search Report dated Aug. 5, 2009.

\* cited by examiner

METHOD AND APPARATUS FOR PREDICTIVE FRAME SELECTION SUPPORTING ENHANCED EFFICIENCY AND SUBJECTIVE QUALITY

CROSS-REFERENCE TO RELATED APPLICATIONS

This application claims the benefit, under 35 U.S.C. § 365 of International Application PCT/US2009/000637 and filed Jan. 30, 2009, which was published in accordance with PCT Article 21(2) on Sep. 17, 2009, in English, and which claims the benefit of U.S. Provisional Patent Application No. 61/035,187, filed on Mar. 10, 2008, in English, which are incorporated by reference in their respective entireties.

TECHNICAL FIELD

The present principles relate generally to video encoding and, more particularly, to a method and apparatus for predictive frame selection supporting enhanced efficiency and subjective quality.

BACKGROUND

Typically, most current advanced video coding standards specify three common frame types to encode a frame; that is, the I-frame, P-frame, and B-frame. A B-frame is an abbreviation for bi-directional frame, or bi-directional predictive frame, or sometimes bi-predictive frame. B-frames rely on the frames preceding and following them and only include data that has changed from the preceding frame or is different from data in the next frame. P-frame is an abbreviation for predictive frame, or predicted frame. P-frames follow I-frames and include only the data that has changed from the preceding I-frame. P-frames rely on I-frames to fill in most of its data. I-frames, also known as keyframes, is an abbreviation for intra-frame. An I-frame stores all the data necessary to display a frame and involves no inter-frame motion compensated prediction (MCP). In common usage, I-frames are interspersed with P-frames and B-frames in a compressed video. P-frame coding allows only forward inter-frame MCP, while B-frame coding allows not only forward, but also backward, and bi-directional MCP. How to select the right frame-type to code a frame is an important issue that affects not only coding efficiency, but also the perceptual quality of coded video.

I-frame type selection is often straightforward. Besides the $1^{st}$ video frame, a frame will be coded as an I-frame whenever there is a scene-change, or the maximum Group-of-Pictures (GOP) length has been reached. In practice, the GOP structure with a maximum GOP length is often applied to ensure fast random access of encoded video. However, a predictive/bi-predictive (P/B) frame type selection is a non-trivial and more difficult problem. Compared to P-frame coding, B-frame coding allows more flexible prediction choices, and hence, generally yields better coding efficiency for an individual frame. However, the efficiency of coding the frame that immediately follows the B-frame(s) may be compromised. This is because with that frame's immediate preceding frame(s) being coding as B-frame(s), its prediction now refers to the frame that immediately precedes the B-frame(s), which hence may lead to compromised coding efficiency. P/B frame type should be selected to achieve the best overall coding efficiency. In practice, another disadvantage of B-frame coding is resultant flickering artifact. Due to backward prediction and bi-directional prediction, the resultant inter-frame difference between a coded P-frame and B-frame, or between two coded B-frames, is usually more significant than that between two coded P-frames. Hence, more flickering artifact may be observed with more B-frame coding, especially at low or medium coding bit rates.

Besides frame type selection/decision, this same problem is addressed in other related and similar contexts. For example, the same problem has been addressed in the dynamic/adaptive Group of Pictures (GOP) structure. Moreover, the same problem has been addressed in the context of reference frame placement/insertion. Basically, the problem is how to properly decide whether a frame should be coded into a P-frame or a B-frame such that the overall coding performance of both the concerned frame and its neighboring frames are optimized.

All the existing schemes primarily target improving the coding efficiency. For that purpose, a widely recognized common heuristic is as follows, as described with respect to a first and a second prior art approach: a P-frame (or a reference frame) should be inserted when inter-frame motion is high, i.e., when the correlation between two neighboring frames is low, while non-reference B-frame coding is more efficient and should be applied to encode low or medium motion frames.

In existing references and literature, the P/B frame type selection problem was usually addressed for GOP based coding scenarios. In a third prior art approach, a scheme was proposed to find the rate-distortion optimal P/B coding pattern/structure of a GOP. For each frame inside a GOP, besides P/B decision, the scheme also searches for the optimal quantization parameter for constant bit rate (CBR) rate control. In spite of its optimality on coding efficiency, this scheme requires multiple actual encoding passes of a frame to see the result of a decision, and thus, incurs impractical computation complexity, not to mention additional latency requirements which may be prohibitive in real-time encoding scenarios.

In fact, most existing schemes are low complexity practical solutions. One type of P/B selection schemes is heuristic based approaches. In the second prior art approach, a P-frame will be inserted when the accumulated motion intensity exceeds a certain threshold, where the motion intensity is measured with the sum of the absolute magnitudes of motion vectors (MV), while the scheme in a fourth prior art approach suggests that a frame will be coded as a B-frame when the motion speed is almost constant, i.e., when its forward and backward motion intensity are similar or balanced. In principle, the heuristics on accumulated motion and balanced motion are complementary, and hence, if applied altogether, better performance will be achieved.

Another type of P/B selection approach is based on mathematical models. However, in practice, B-frame coding may cause annoying flickering artifact due to the involved backward prediction, which is more easily observed at low motion frames.

In a fifth prior art approach, an analytical function is derived that relates the coding gain of a GOP with its P/B pattern and the inter-frame and intra-frame characteristics, and optimal the GOP structure is the one maximizing the coding gain. Other schemes directly model the optimal number of consecutive B-frames as a function of the average motion estimation error and the average spatial activity of a GOP. Instead of an explicit form of mathematical function/model, in a sixth prior art approach, P/B frame type selection is regarded as a classification problem, where the input feature variables are the means and variations of motion estimation error of the current frame and the next frame, and the output is a P/B decision. Given a large amount of training data, the distribution density function for classification is derived with Gaussian Mixture Models (GMMs) and the Expectation Maximization (EM) method. However, for all these model-based schemes, their modeling accuracies are not as well justified as in the heuristic-based approaches, and efficient coding performance may not be always guaranteed.

It is known that in the P/B frame type selection scheme, how to accurately measure the motion intensity of a frame is often an important issue. Frame motion intensity also represents the coding complexity of a frame, as a higher motion frame is also a more complex frame for encoding. Various frame-level histogram based measures were investigated in the prior art. These measures can be easily calculated. However, they are only good at measuring global motion, but not local motion. Motion estimation or compensation helps to derive a more accurate measure of motion intensity. In the second prior art approach, the sum of absolute motion vector (MV) magnitudes of all the macroblocks (MB) of a frame is used to measure motion, while in the sixth prior art approach, only the motion estimation error is used for the measure. However, none of them comprehensively accounts for both the motion vectors and the motion estimation error, which may lead to a more accurate frame complexity measure, and hence, better P/B selection performance.

SUMMARY

These and other drawbacks and disadvantages of the prior art are addressed by the present principles, which are directed to a method and apparatus for predictive frame selection supporting enhanced efficiency and subjective quality.

According to an aspect of the present principles, there is provided an apparatus. The apparatus includes an encoder for encoding a picture using a selection scheme that selects between encoding the picture as a single direction inter predictive picture type and a bi-directional inter predictive picture type based on coding efficiency and a determination of a flickering artifact resulting from coding the picture as the bi-directional inter predictive picture type.

According to another aspect of the present principles, there is provided a method. The method includes encoding a picture using a selection scheme that selects between encoding the picture as a single direction inter predictive picture type and a bi-directional inter predictive picture type based on coding efficiency and a determination of a flickering artifact resulting from coding the picture as the bi-directional inter predictive picture type.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
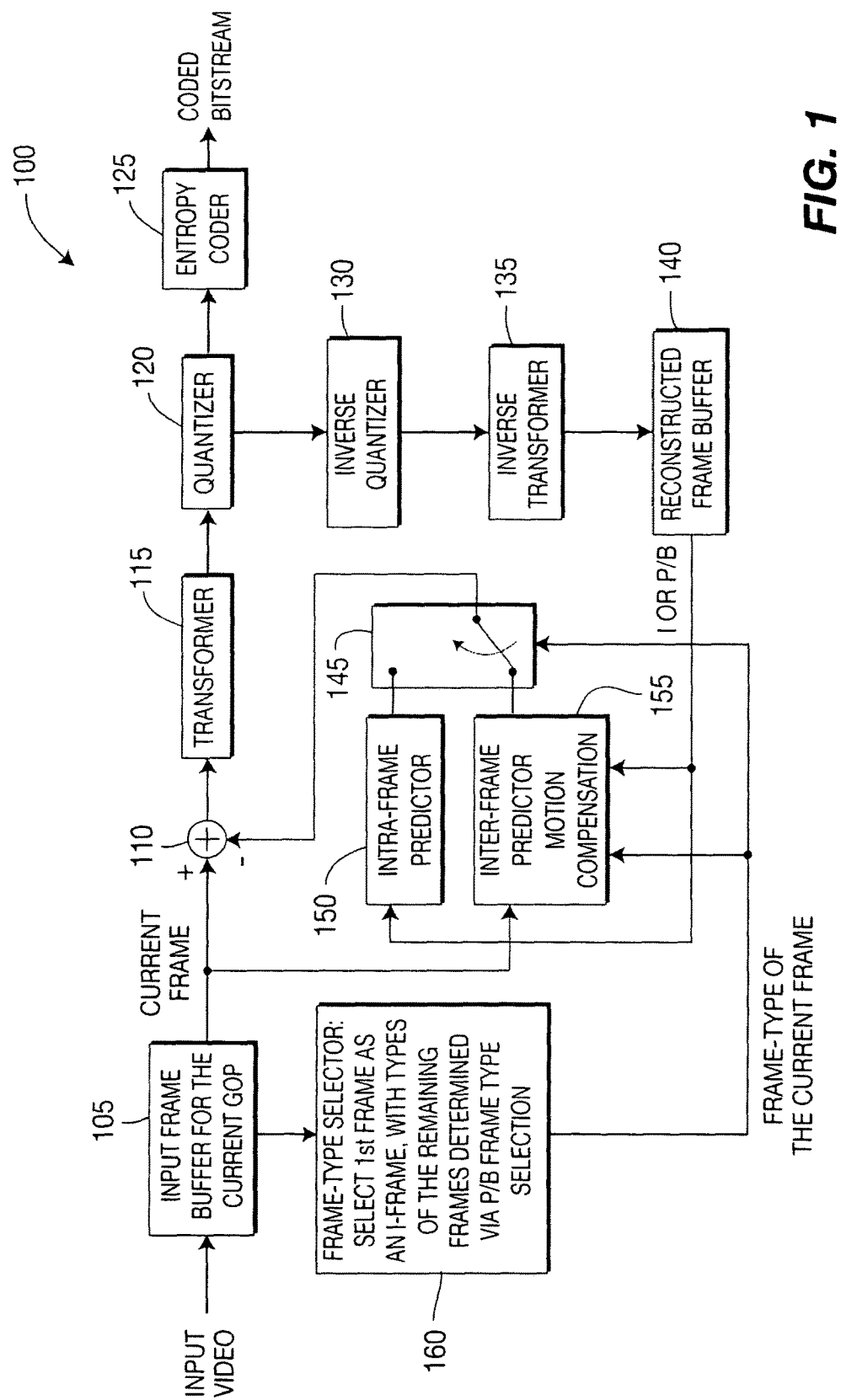
FIG. 1 is a block diagram for a video encoder, in accordance with an embodiment of the present principles.

The present principles are directed to a method and apparatus for predictive frame selection supporting enhanced efficiency and subjective quality.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, it is to be appreciated that while one or more embodiments of the present principles are described herein with respect to the MPEG-4 AVC standard, the present principles are not limited to solely this standard and, thus, may be utilized with respect to other video coding standards, recommendations, and extensions thereof, including extensions of the MPEG-4 AVC standard, while maintaining the spirit of the present principles. For example, the present principles are applicable to all existing video coding standards and recommendations including, but not limited to, the ISO/IEC Moving Picture Experts Group-2 Standard (hereinafter the "MPEG-2 Standard"), the MPEG-4 AVC Standard, the ITU-T H.263 Recommendation (hereinafter the "H.263 Recommendation"), and the Society of Motion Picture and Television Engineers (SMPTE) Video Codec-1 Standard (hereinafter the "VC-1 Standard"). Moreover, as a further example, the present principles are also applicable to hierarchical B-frames of the MPEG-4 AVC Standard.

Also, as used herein, the word "picture" refers to any of a field or a frame. The preceding definition is consistent with the definition of picture set forth in the MPEG-4 AVC Standard.

Turning to FIG. 1, a video encoder is indicated generally by the reference numeral 100. The video encoder 100 includes an input frame buffer (for the current GOP) 105 having a first output in signal communication with a non-inverting input of a combiner 110. An output of the combiner 110 is connected in signal communication with an input of a transformer 115. An output of the transformer 115 is connected in signal communication with an input of a quantizer 120. A first output of the quantizer 120 is connected in signal communication with an input of an entropy coder 125. A second output of the quantizer 120 is connected in signal communication with an input of an inverse quantizer 130. An output of the inverse quantizer 130 is connected in signal communication with an input of an inverse transformer 135. An output of the transformer 135 is connected in signal communication with an input of a reconstructed frame buffer 140. An output of the reconstructed frame buffer 140 is connected in signal communication with a first input of a inter-frame predictor with motion compensation 155 and an input of an intra-frame predictor 150.

An output of the inter-frame predictor with motion compensation 155 is connected in signal communication with a first input of a switch 145. An output of the intra-frame predictor 150 is connected in signal communication with a second input of the switch 145. An output of the switch 145 is connected in signal communication with a non-inverting input of the combiner 110.

A second output of the input frame buffer 105 is connected in signal communication with an input of a frame-type selector 160. An output of the frame-type selector 160 is connected in signal communication with a second input of the inter-frame predictor with motion compensation 155 and with a control input of the switch 145 for selecting either the first input or the second input of the switch 145.

As noted above, the present principles are directed to a method and apparatus for predictive frame selection supporting enhanced efficiency and subjective quality.

Thus, in accordance with the present principles, the inefficiencies, limitations and problems described as being associated with the prior art methods, is overcome by an effective and efficient P/B frame type selection scheme. In an embodiment, this scheme accounts for several well-justified heuristics altogether in one unified framework, with a more accurate frame motion intensity measure adopted. Unlike the existing schemes, which primarily target optimal coding efficiency only, our scheme not only improves coding efficiency, but also effectively reduces the annoying B-frame flickering artifact. This is because, unlike existing schemes, in an embodiment of our scheme, a frame is determined to be coded as a B-frame not only if B-frame coding is more efficient, but also if B-frame coding will not cause significant flickering artifact. Hence, the overall perceptual video coding quality is greatly enhanced.

Note that unlike in the other standards, hierarchical B-frames as defined in the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "MPEG-4 AVC Standard") can be used for prediction reference, which definitely yields better coding efficiency than using the typical non-reference B-frames. Hierarchical B-frames as defined in the MPEG-4 AVC Standard can be applied whenever there are a certain number of consecutive B-frames in the sequence, i.e., $2^{N-1}$, where N=2, 3, 4 . . . . In an embodiment, the proposed scheme also applies to the case when hierarchical B-frames are allowed.

Although B-frame coding allows more flexible prediction modes than P-frame coding, e.g., backward and bidirectional prediction, in practice, its application does not always lead to better overall coding efficiency, because the immediately following frame of a B-frame has to use the immediately preceding frame of the B-frame for prediction reference, which may lead to compromised coding efficiency. Even worse, uncontrolled B-frame coding may cause serious flickering artifact, especially at low or medium coding bit rates. Existing P/B frame type selection schemes all aim at enhancing coding efficiency, but not perceptual video coding quality, which is definitely more important in practice. In accordance with an embodiment of the present principles, an effective P/B frame type selection scheme is presented, where a new and more accurate measure of frame motion intensity, or coding complexity, is adopted, and several well-justified heuristics are accounted for altogether in one unified framework. In an embodiment, rather than a B-frame, a frame will be coded as a P-frame when at least one of the following three conditions is met: (i) accumulated motion is high (e.g., greater a first threshold); (ii) forward and backward motion is not balanced (e.g., the difference is greater than a second threshold); and (iii) motion is low (e.g., less than a third threshold). This scheme not only enhances coding efficiency but also reduces the annoying B-frame flickering artifact, and hence, greatly improves the overall perceptual quality of coded video.

As used herein with respect to the first condition above, the phrase "accumulated motion" refers to the summed motion intensity, or frame complexity, for example, as defined in Equation (4) as complexity, up to the current frame, for which the P/B frame type decision is made. The term "motion" with respect to the phrase "accumulated motion" refers to the fact that higher motion intensity leads to higher coding cost for a frame, and hence, represents higher frame coding complexity.

With respect to the second and third conditions above, references to the term "motion" refers to the same general concept of motion intensity or frame complexity as in the first condition. In an embodiment, such motion also relates to the new and effective metric defined in Equation (4).

Of course, given the teachings of the present principles provided herein, one of ordinary skill in this and related arts will contemplate these and various other implementations and interpretations of the above mentioned motions (e.g., accumulated, forward motion, backward motion), while maintaining the spirit of the present principles.

Thus, in accordance with the present principles, we describe a new P/B frame type selection scheme. The novelties are three fold. First, unlike existing schemes, which all target improving coding efficiency only, such as, for example, the second, the third, the fourth, the fifth, and the sixth prior art approaches mentioned above, our scheme aims at not only improving coding efficiency, but also reducing the annoying B-frame flickering artifact. Consequently, one significant difference of our scheme from the existing schemes is that: for very low motion frames, our scheme prefers no B-frame coding to prevent B-frame flickering, while the existing schemes prefer more B-frame coding in this case to improve coding efficiency. Second, unlike the two existing heuristic-based approaches in the second and fourth prior art approached mentioned above, which involve either accumulated motion checking or balanced motion checking, in an embodiment, our scheme integrates several helpful complementary heuristics altogether in one unified framework, which is more comprehensive, and renders better overall performance. Thirdly, our scheme uses a more accurate frame complexity measure than those used in existing schemes such as, for example, the second and the sixth prior art approaches mentioned above, which account for coding complexities of both the motion vector and the motion estimation error. Extensive experimentation results show that this new scheme effectively exploits the B-frame coding to improve coding efficiency, while at the same time properly restricting the application of B-frame coding to reduce the undesirable flickering artifact. Therefore, B-frame coding is more heavily restricted in our scheme to reduce the undesirable flickering artifact. The basic idea is that: whenever B-frame coding is not significantly more efficient than P-frame coding, P frame type will be selected to ensure good perceptual video coding quality.

Specifically, in our scheme, a frame will be coded as a P-frame if any one of the following three conditions is satisfied. Otherwise, the frame will be coded into a B-frame. Herein, we denote the coding complexity, i.e., the motion intensity, of frame i as $Cmpl_i$.

Condition on high accumulated motion: if the accumulated motion intensity from the frame right after the last reference frame to the current frame is larger than a threshold TH1, that is:

$$\sum_{i=last\_ref+1}^{curr\_frm} Cmpl_i > TH1. \qquad (1)$$

Herein, curr_frm and last_ref denote the frame number of the current frame and the last reference frame, respectively.

Condition on unbalanced motion: if the forward and backward motion intensity of the current frame is not balanced, that is:

$$\max\left(\frac{Cmpl_{curr\_frm}}{Cmpl_{curr\_frm+1}}, \frac{Cmpl_{curr\_frm+1}}{Cmpl_{curr\_frm}}\right) > TH2. \qquad (2)$$

Herein, TH2 is a threshold. $Cmpl_{curr\_frm}$ actually represents the forward motion intensity of the current frame, while its backward motion intensity is presumed the same as the forward motion intensity of the next frame. As such, one does not need to calculate the backward motion intensity of a frame, which significantly saves computation complexity.

Condition on low motion: if the current frame motion intensity is below a certain threshold TH3, that is:

$$Cmpl_{curr13\_frm} < TH3 \qquad (3)$$

We can see that in the above scheme, three conditions are integrated together with a common frame complexity measure. This leads to tighter restriction on the use of B-frame coding than that in existing schemes, e.g., such as in the second and fourth prior art approaches mentioned above. Consequently, the flickering artifact from excessive B-frame coding can be more effectively reduced.

The first condition on high accumulated motion is mainly for optimal coding efficiency. As in the second prior art approach mentioned above, the following has been well recognized: whenever motion is high, it is more efficient to insert a P-frame to refresh the reference for better prediction performance in the following frames.

The justification for the second condition on unbalanced motion is as follows. When the forward and backward motion of the concerned frame is not balanced, either forward prediction or backward prediction will dominate if the concerned frame is coded into a B-frame. Thus, B-frame coding yields similar efficiency with that of P-frame coding. As mentioned earlier, in this case, to reduce B-frame flickering, P frame type will be selected, which yields similar coding efficiency, but less flickering artifact, and hence, overall, is a better choice than B-frame coding.

The third condition on low motion is particularly for reducing the B-frame flickering artifact. In fact, as has been widely recognized in the existing schemes such as, for example, the first, the second, and the fourth prior art approaches mentioned above, in terms of coding efficiency, B-frame coding is definitely a better choice than P-frame coding for coding low motion frames. However, low motion frames are also more sensitive to the flickering artifact. Especially in the case of very low motion (e.g., the motion intensity is below a certain threshold as defined in Equation (3)), the coding gain of a B-frame coding over a P-frame coding is not much, as forward prediction alone already renders superior prediction performance. However, very low motion frames are very sensitive to the flickering artifact. Therefore, in this case, P-frame coding will be selected for better overall coding performance. This practice is different from all the existing schemes, where B-frame coding will be selected in this case for better coding efficiency.

The actual values of the three thresholds in Equations (1) through (3) are related with the specific frame complexity measure adopted. Different measure leads to different threshold values. In fact, our new scheme can accommodate any such frame complexity or motion intensity measure, e.g., such as those proposed in the first, the second, and sixth prior art approaches mentioned above. Thus, in accordance with a specific embodiment of the present principles, a new frame complexity measure is developed, which is more comprehensive and more accurate than the existing measures. The new measure is defined as follows:

$$\text{Cmpl} = \overline{R}_{mv} + \overline{\text{MAD}} \quad (4)$$

Herein, Cmpl denotes the complexity of a frame. $\overline{R}_{mv}$ denotes the averaged motion vector coding bits over all the macroblocks in a frame, while $\overline{\text{MAD}}$ denotes the averaged Luminance mean-absolute-difference (MAD) of the macroblock motion estimation error over all the macroblocks in a frame. The simple summation form of Equation (4) is derived from good heuristics via extensive experiments. The calculation of the proposed measure involves motion estimation, and it accounts for both the motion vector intensity and the intensity of the remaining motion estimation residue. Therefore, it is more comprehensive and more accurate than existing measures used in, for example, the first, the second, and the sixth prior art approaches mentioned above.

The new complexity measure is pre-calculated for the proposed P/B frame type selection. In accordance with one embodiment, it is calculated in a pre-analysis process, which only conducts single reference forward prediction from the previous original input video frame. To reduce computation complexity, the pre-analysis motion estimation checks only Inter16×16 mode and only full-pixel motion vectors. To calculate motion vector coding bits of each macroblock, the same fast approximation scheme as used in rate-distortion (RD) optimized motion estimation of the MPEG-4 AVC Joint Model (JM) encoder is adopted. The incurred computation complexity is acceptable in practical video encoders, even for real-time encoding, as has been verified in our current implementation. With our current pre-analysis implementation, the thresholds values are set as follows: TH1=12, TH2=2, TH3=4. Of course, the present principles are not limited to the preceding values for the above described three thresholds corresponding to the above described three conditions and, thus, other values may also be used, while maintaining the spirit of the present principles.

Figure 2:
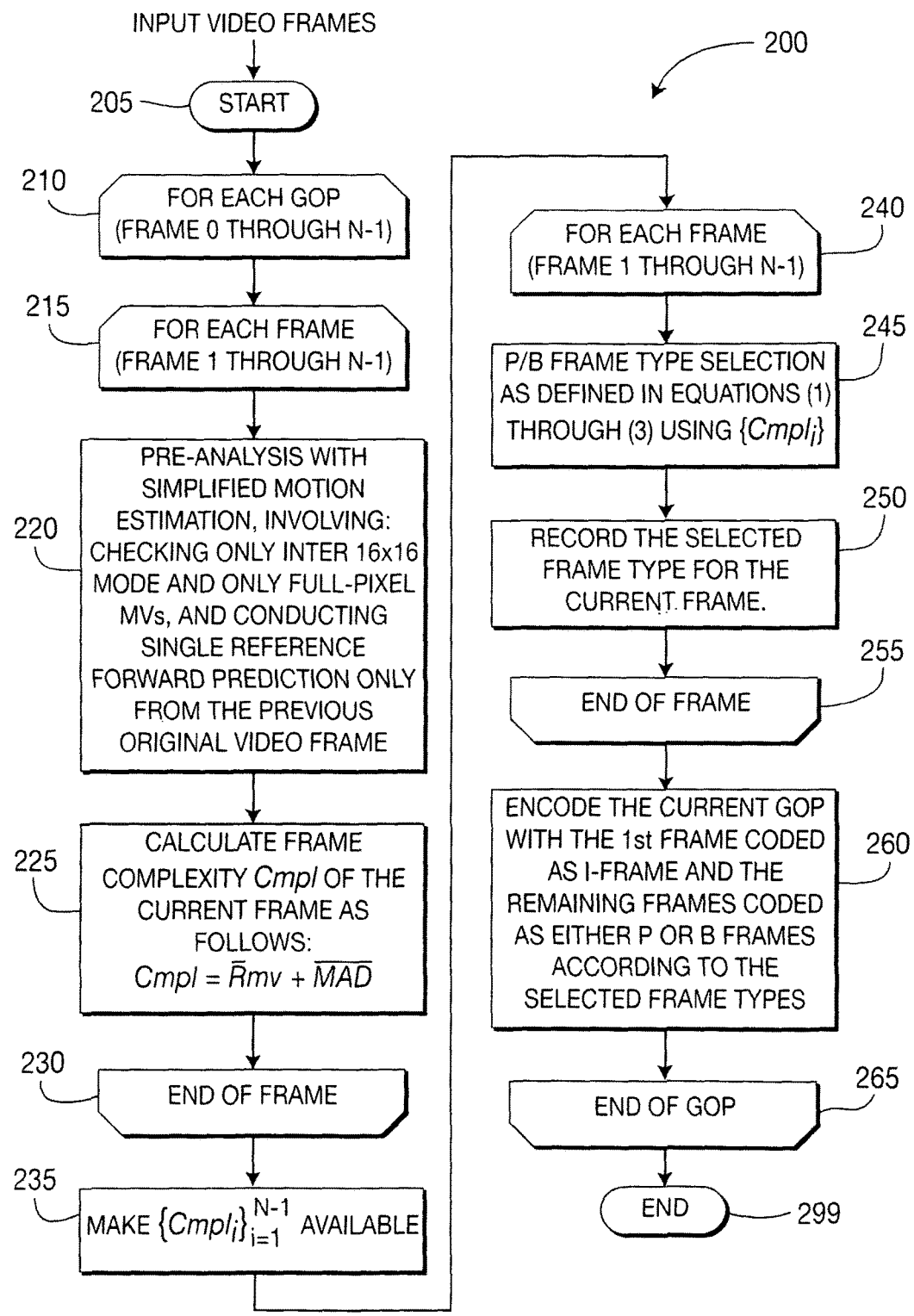
FIG. 2 is a flow diagram for an exemplary method for P/B frame type selection in a video encoder, in accordance with an embodiment of the present principles.

Turning to FIG. 2, an exemplary method for P/B frame type selection in a video encoder is indicated generally by the reference numeral 200.

The method 200 includes a start block 205 that passes control to a loop limit block 210. The loop limit block 210 begins a loop for each group of pictures (GOP) in a current video sequence being processed, from frame 0 through frame N−1 of the video sequence, and passes control to a loop limit block 215. The loop limit block 215 begins a loop for each frame in a current group of pictures being processed, from frame 1 through frame N−1 of the current group of pictures, and passes control to a function block 220.

The function block 220 performs a pre-analysis with simplified motion estimation involving, checking only Inter16×16 mode, checking only full-pixel motion vectors, and performing single reference forward prediction from the previous original frame, and passes control to a function block 225. The function block 225 calculates a frame complexity measure Cmpl of the current frame as Cmpl= $\overline{R}_{mv} + \overline{\text{MAD}}$, and passes control to a loop limit block 230. The loop limit block 230 ends the loop over each frame of a current group of pictures, and passes control to a function block 235. The function block 235 makes $\{\text{Cmpl}_i\}_{i=1}^{N-1}$ available (for use by the sequent steps of method 200), and passes control to a loop limit block 240. The loop limit block 240 begins a loop for each frame in a current group of pictures being processed, from frame 1 through frame N−1 of the current group of pictures, and passes control to a function block 220. The function block 245 performs P/B frame type selection as per Equations (1) through (3) using $\{\text{Cmpl}_i\}$, and passes control to a function block 250. The function block 250 records the selected frame type for the current frame, and passes control to a loop limit block 255. The loop limit block 255 ends the loop over each frame, and passes control to a function block 260. The function block 260 encodes the current group of pictures with the first frame coded as an I-frame and the rest of the frames coded as either P or B frames, according to the selected frame types, and passes control to a loop limit block 265. The loop limit block 265 ends the loop over the group of pictures, and passes control to an end block 299.

Extensive experiment results show that the proposed P/B frame type selection scheme can effectively exploit the coding efficiency benefit from B-frame coding, while avoiding the serious B-frame flickering artifact. Comparing with no B-frame coding or coding with a fixed number of consecutive B-frames, the proposed adaptive B-frame coding scheme achieves better coding efficiency, and better perceptual video coding quality with much less B-frame flickering artifact. The complexity of the scheme is not high, and can be applied for real-time video encoding.

A description will now be given of some of the many attendant advantages/features of the present invention, some of which have been mentioned above. For example, one advantage/feature is an apparatus having an encoder for encoding a picture using a selection scheme that selects between encoding the picture as a single direction inter predictive picture type and a bi-directional inter predictive picture type based on coding efficiency and a determination of a flickering artifact resulting from coding the picture as the bi-directional inter predictive picture type.

Another advantage/feature is the apparatus having the encoder as described above, wherein the selection scheme selects encoding the picture as the single direction inter predictive picture type, rather than the bi-directional inter predictive picture type, when at least one of an accumulated motion is greater than a first threshold, a difference between a single direction motion intensity and bi-directional motion intensity is greater than a second threshold, and a picture motion is less than a third threshold.

Yet another advantage/feature is the apparatus having the encoder as described above, wherein at least the coding efficiency is based on a picture complexity measure. The picture complexity measure is based on at least a motion vector coding complexity and a motion estimation error coding complexity.

Still another advantage/feature is the apparatus having the encoder wherein at least the coding efficiency is based on a picture complexity measure as described above, wherein the picture complexity measure is calculated as a sum of average macroblock motion vector coding bits and an average macroblock mean-absolute-difference of a Luminance motion estimation error.

Also, another advantage/feature is the apparatus having the encoder wherein the picture complexity measure is calculated as a sum as described above, wherein the picture complexity measure accounts for both motion vector intensity and residue intensity.

Moreover, another advantage/feature is the apparatus having the encoder wherein at least the coding efficiency is based on a picture complexity measure as described above, wherein the picture is one of a plurality of original pictures corresponding to a video sequence. The picture complexity measure is calculated using a pre-analysis process with simplified motion estimation. The pre-analysis process involves checking only Inter16×16 mode and only full-pixel motion vectors, and conducting only single reference single direction prediction from a previous original picture from among the plurality of original pictures.

Further, another advantage/feature is the apparatus having the encoder as described above, wherein the bi-directional inter predictive picture type includes a hierarchical bi-directional inter-predictive picture type.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus for selecting a predictive picture, comprising:
an encoder for encoding a picture using a selection scheme that selects between encoding the picture as a single direction inter predictive picture type and a bi-directional inter predictive picture type based on motion intensity of the picture and a determination of whether a flickering artifact results from coding the picture as the bi-directional inter predictive picture type,
wherein the selection scheme selects encoding the picture as the single direction inter predictive picture type, rather than the bi-directional inter predictive picture type, when at least one of following conditions are satisfied: an accumulated motion intensity is greater than a first threshold, a forward and backward motion intensity of the picture is not balanced, and a picture motion intensity is less than a third threshold,
wherein a picture complexity measure accounts for both motion vector intensity and residue intensity,
wherein the picture is one of a plurality of original pictures corresponding to a video sequence, and the picture complexity measure is calculated using a pre-analysis process with simplified motion estimation, the pre-analysis process involving checking only Inter 16×16 mode and full-pixel motion vectors, and conducting only single reference single direction prediction from a previous original picture from among the plurality of original pictures,
wherein the bi-directional inter predictive picture type comprises a hierarchical bi-directional inter-predictive picture type.

2. A method for selecting a predictive picture, comprising:
encoding a picture using a selection scheme that selects between encoding the picture as a single direction inter predictive picture type and a bi-directional inter predictive picture type based on efficiency motion intensity of the picture and a determination of whether a flickering artifact results from coding the picture as the bi-directional inter predictive picture type,
wherein the selection scheme selects encoding the picture as the single direction inter predictive picture type, rather than the bi-directional inter predictive picture type, when at least one of following conditions are satisfied: an accumulated motion intensity is greater than a first threshold, a forward and backward motion intensity of the picture is not balanced, and a picture motion intensity is less than a third threshold,
wherein a picture complexity measure accounts for both motion vector intensity and residue intensity,
wherein the picture is one of plurality of original pictures corresponding to video sequence, and a picture complexity measure is calculated using a pre-analysis process with simplified motion estimation, the pre-analysis process involving checking only Inter 16×16 mode and only full-pixel motion vectors, and conducting only single reference single direction prediction from a previous original picture from among the plurality of original pictures, wherein the bi-directional inter predictive picture type comprises a hierarchical bi-directional inter-predictive type.

\* \* \* \* \*